United States Patent [19]

Lee

[11] Patent Number: 5,736,673

[45] Date of Patent: Apr. 7, 1998

[54] CABLE AND MOUNTING BRACKET ASSEMBLY AND METHOD

[75] Inventor: Noel Lee, Daly City, Calif.

[73] Assignee: Monster Cable International, Ltd., Bermuda

[21] Appl. No.: 443,786

[22] Filed: May 18, 1995

[51] Int. Cl.⁶ .................................................... H02G 3/10
[52] U.S. Cl. ........................... 174/48; 220/3.3; 174/60
[58] Field of Search .................... 339/29 R; 174/135, 174/48, 53, 50, 58, 60; 220/4.02, 3.3

[56] References Cited

U.S. PATENT DOCUMENTS

| | | | |
|---|---|---|---|
| 4,155,613 | 5/1979 | Brandeau | 339/29 R |
| 4,192,965 | 3/1980 | Baum | 174/135 |
| 5,091,607 | 2/1992 | Stob | 174/48 |
| 5,170,014 | 12/1992 | Borsh | 174/53 |

Primary Examiner—Kristine L. Kincaid
Assistant Examiner—Dhiru R. Patel
Attorney, Agent, or Firm—Haynes and Boone, L.L.P.; Warren B. Kice

[57] ABSTRACT

A cable and mounting bracket assembly and method in which a cable having at least two electrical conductors and an insulative housing surrounding the conductors is secured between two devices to be electrically connected. The cross-sectional dimensions of the cable are such that the cable can be folded over itself in a manner so that the two sections of the cable respectively extend from the fold are positioned at an angle to each other. The folded cable portion is disposed adjacent the corner of a room or cabinet and a mounting bracket is positioned over the cable to secure the two cable sections in the angular relationship.

13 Claims, 1 Drawing Sheet

CABLE AND MOUNTING BRACKET ASSEMBLY AND METHOD

BACKGROUND OF THE INVENTION

This invention relates to an assembly and method for electrically connecting two electrical devices and, more particularly, to such an assembly and method which permits a electrical signal transmission cable to be simply and effectively mounted to walls, floors, cabinets or the like.

There are many applications which require a connection between two electrical devices in the home or business environment. For example, home entertainment products, including audio and video systems, require a multitude of cables connecting audio source components and television monitors to audio switching devices, amplifiers, receivers, processors and the like; and, of course, speaker cables that connect audio amplifiers, or the like, to loudspeakers. With the advent of home theater systems, often involving five or six channels of audio and one or more subwoofers, VCRs and monitors, it can be appreciated that the cabling requirements for these types of systems is significant.

The problem with using a very large number of cables is that they are very unattractive from an aesthetic standpoint, especially when they have to run long distances between components such as in the case, for example, when two or more loudspeakers are located a significant distance from their amplifiers.

Another problem occurs in connection with these type installations when the cables have to be routed around sharp corners, such as those encountered in cabinets or rooms, since it is very difficult, if not impossible, to route and mount the cables in a manner to effect a sharp turn and to insure a "clean" look. Since many high quality cables used in these applications are relatively large in diameter and/or stiff, this problem is compounded when they are used in the above manner.

BACKGROUND OF THE INVENTION

It is therefore an object of the present invention to provide an assembly and method for electrically connecting two electrical devices.

It is a further object of the present invention to provide an assembly and method of the above type which enables an electrical signal transmission cable to be neatly mounted relative to a corner of a room or cabinet.

It is a further object of the present invention to provide an assembly and method of the above type in which the above mounting is simple, very easy to complete, and requires no special skills or tools.

Towards the fulfillment of these and other objects, the assembly of the present invention is designed to secure a cable to a floor adjacent a corner of a room or a cabinet and includes a cable having at least two electrical conductors and an insulative housing surrounding the conductors. The cross-sectional dimensions of the cable are such that the cable can be folded over itself in a manner so that the two sections of the cable respectively extend from the fold are positioned at an angle to each other. A specially designed mounting bracket extends over the over the cable to secure the two cable sections in the angular relationship to the floor.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
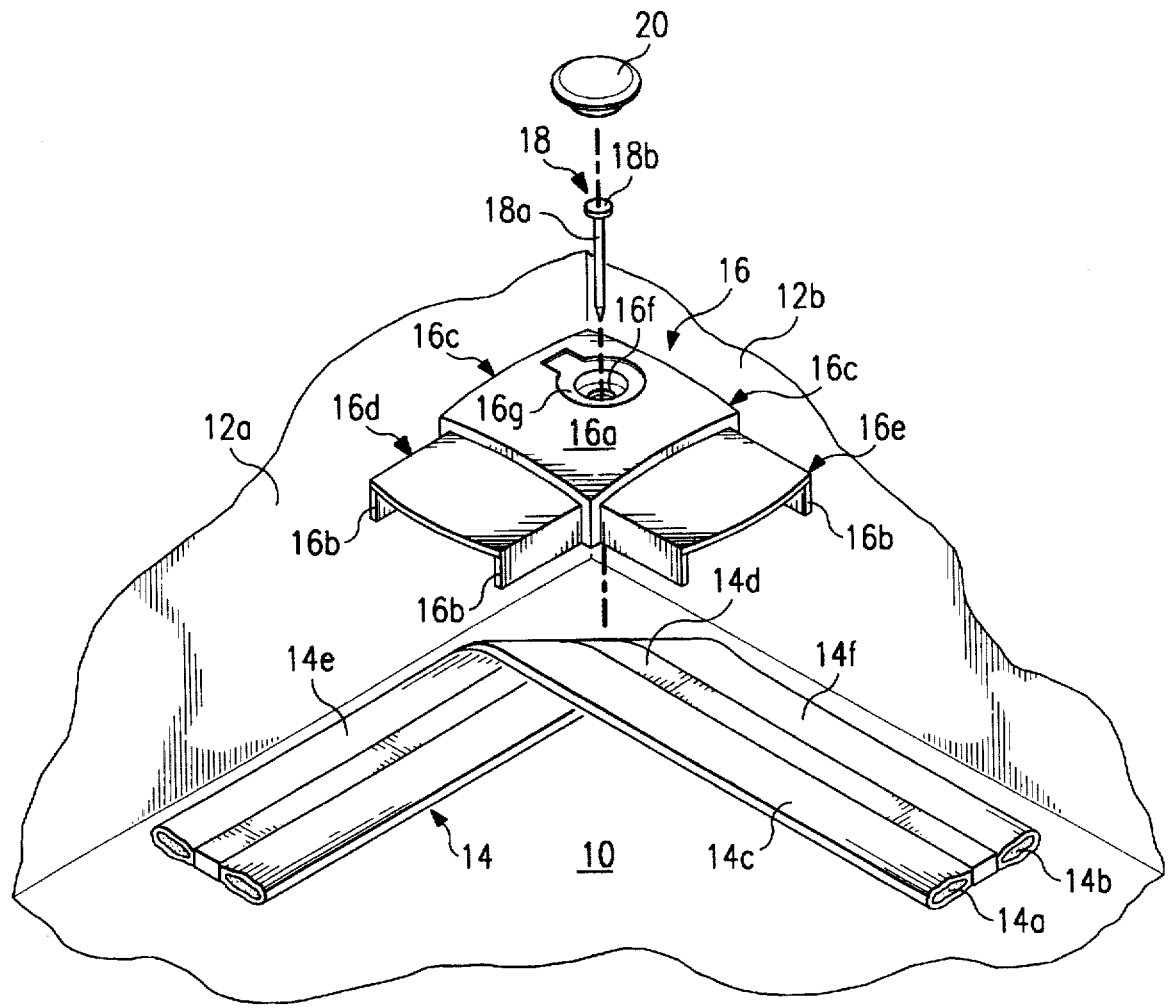
FIG. 1 is an exploded perspective view of the assembly of the present invention.

Referring to FIG. 1 of the drawing, the reference numeral 10 refers to the floor of a house or cabinet which also includes two upright walls 12a and 12b extending perpendicular to each other and to the floor. It will be assumed, for the purposes of describing an example of an application of the present invention, that an electrical signal transmission cable is be routed around the corner formed at the intersection of the two walls 12a and 12b and the floor 10 to make an electrical connection between two electrical components or between one component and a power source, or the like.

To this end, a cable 14 is provided which is constructed of two spaced, parallel conductors 14a and 14b for respectively carrying the positive and negative portions of an electrical signal. A insulative sheath 14c, having a width greater than its height, extends around and between the conductors 14a and 14b.

The cable 14 is initially positioned on the floor 10 adjacent the above-mentioned corner in a manner so that its two ends (not shown) are connectable to the components or devices to be connected. The portion of the cable 14 immediately adjacent the corner is then folded over itself as shown in FIG. 1 to form a folded portion 14d, it being understood that the fold is such that the two sections 14e and 14f of the cable 14 extending from the folded portion are positioned at right angles to each other. Thus, the cable section 14e extends along, and parallel to, the wall 12a and the cable section 14f extends along, and parallel to, the wall 12b.

A mounting bracket 16 is provided to secure the cable 14 in the position shown in FIG. 1. The bracket 16 is in the form of an open housing having a roof 16a and a plurality of sidewalls 16b of a height sufficient to elevate the roof off of the floor when the sidewalls are placed on the floor 10. The bracket 16 has a first section 16c having essentially a square profile and sized to receive the folded portion 14a of the cable 14, a second section 16d extending from one wall of the section 16c for receiving a portion of the cable section 14e and a third section 16e extending from a wall adjacent said one wall for receiving a portion of the cable section 14f. The bracket sections 16d and 16e thus extend at right angles to each other to respectively receive the mutually perpendicular cable sections 14e and 14f.

A through opening 16f extends through the roof 16a of the housing 16, and a counterbore 16g extends from the upper surface of the roof 16a for a short distance and surrounds the opening 16f. A fastener, in the form of a nail 18, is sized so that its shank portion 18a extends through the opening 16f in a relatively close fit and its head portion 18b is accommodated by the counterbore 16g.

Figure 2:
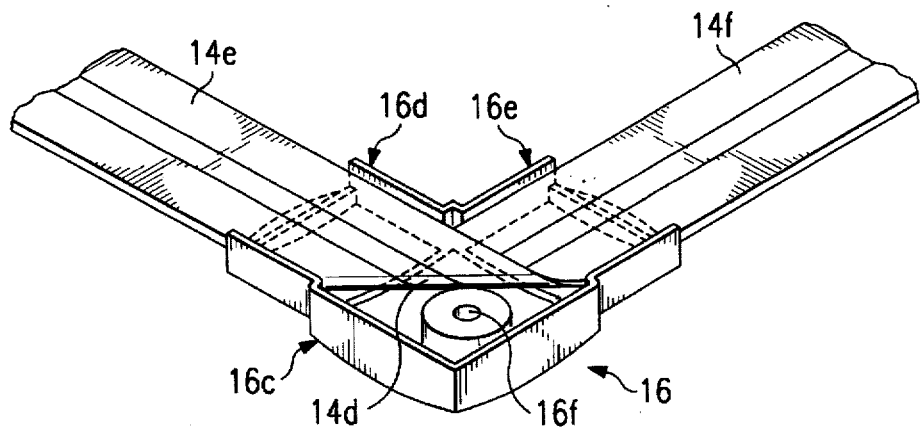
FIG. 2 is a bottom perspective view of the assembly of FIG. 1.

FIG. 2 depicts the bracket 16 secured over the cable 14 with both being shown in a bottom perspective for the convenience of presentation. It is noted from FIGS. 1 and 2 that the height of the bracket section 16c is greater than the heights of bracket sections 16d and 16e so that the section 16c can accommodate the folded cable portion 14c and the sections 16d and 16e can accommodate the cable sections 14e and 14f, all with a right fit. After the bracket 16 is secured in the position shown, the shank 18a (FIG. 1) of the nail 18 is inserted into the opening 16f until the end of the shank engages the floor 10. Then a hammer, or the like is used to drive the nail 18 into the floor until the head 18b of the nail enters the counterbore 18g. A punch, or the like is then used with the hammer to further drive the nail 18 into the floor until the head 18b engages the bottom of the counterbore 16g and extends flush with the upper surface of the bracket 16 to complete the installation.

Thus, the cable is thus installed in a neat manner at right angles around the corner formed by the walls 12a and 12b, with a minimum of effort. The step of fastening the bracket to the floor simultaneously secures the cable. It is also noted from FIG. 2 that, in the assembled position of FIG. 2, the opening 16f clears the folded cable portion 14d to permit the nail 18 to extend into the floor 10.

It is understood that variations may be made in the foregoing without departing from the scope of the invention. For example, the assembly and method of the present invention is equally applicable to a connection between two electrical components and to a connection between one component and something else, such as a source of electrical power. Also, other types of fastening techniques can be used to fasten the bracket 16 over the cable 14 and to the floor 10 such as, for example, adhesive or spikes formed on the lower edges of the walls 16b. Further, the application of the assembly is not limited to the floor of a house but is equally applicable to a cabinet, or the like.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An assembly for making an electrical connection from at least one electrical device in a room or cabinet, said assembly comprising a cable connected to said device and comprising at least two electrical conductors and an insulative housing surrounding said conductors, the cross-sectional dimensions of said cable being such that said cable can be folded over itself to form a folded cable portion in a manner so that two sections of the cable extend from said folded cable portion at an angle to each other; and a mounting bracket extending over a portion of said cable to secure said cable sections in said angular relationship, said bracket having an opening extending therethrough and comprising a first bracket portion for extending over said folded cable portion, a second bracket portion for extending over a portion of one of said cable sections, and a third bracket portion for extending over a portion of the other cable section; and a nail extending through said opening for fastening said bracket, and securing the folded cable portion, to a flat structure in said room or cabinet, said opening being located in a manner to allow said nail to clear said folded cable portion.

2. The assembly of claim 1 wherein said first, second, and third bracket portions have respective heights, and wherein the height of said first bracket portion is greater than the heights of said second and third bracket portions to accommodate said fold.

3. The assembly of claim 1 wherein the cable has a length, and, in cross-section, the cable has a width and a height, the width of the cable being greater than the height of the cable.

4. The assembly of claim 1 wherein said angle is substantially a right angle.

5. The assembly of claim 1 wherein said conductors are disposed in a spaced parallel relationship.

6. The assembly of claim 1 wherein said folded cable portion is disposed adjacent a corner of said room or cabinet.

7. An assembly for making an electrical connection from at least one electrical device in a room or cabinet, said assembly comprising a cable connected to said device and comprising at least two electrical conductors and an insulative housing surrounding said conductors; the cross-sectional dimensions of said cable being such that said cable can be folded over itself to form a folded cable portion in a manner so that two sections of the cable extend from said folded cable portion at an angle to each other; and a mounting bracket extending over a portion of said cable to secure said cable sections in said angular relationship, said bracket comprising a first bracket portion for extending over said folded cable portion, a second bracket portion for extending over a portion of one of said cable sections, and a third bracket portion for extending over a portion of the other cable section, the height of said first bracket portion being greater than the heights of said second and third bracket portions to accommodate said fold; and a fastener for fastening said bracket, and securing the folded cable portion, to a flat structure in said room or cabinet.

8. The assembly of claim 7 wherein said fastening means is a nail and wherein said bracket has an opening extending therethrough for receiving said nail.

9. The assembly of claim 8 wherein said opening being located in a manner to allow said nail to clear said folded cable portion.

10. The assembly of claim 7 wherein said angle is approximately ninety degrees.

11. The assembly of claim 7 wherein said conductors are disposed in a spaced, parallel relationship.

12. An assembly for making an electrical connection from at least one electrical device in a room or cabinet, said assembly comprising a cable connected to said device and comprising at least two electrical conductors and an insulative housing surrounding said conductors, the cross-sectional dimensions of said cable being such that said cable can be folded over itself to form a folded cable portion in a manner so that the two sections of the cable respectively extending from said folded cable portion are positioned at an angle to each other; and a mounting bracket extending over a portion of said cable to secure said cable sections in said angular relationship, said mounting bracket comprising a first bracket portion for extending over said folded cable portion, a second bracket portion for extending over a portion of one of said cable sections, a third bracket portion for extending over a portion of the other cable section, and an opening extending through the bracket for receiving a fastener to fasten said bracket to a flat structure in said room or cabinet, said opening being located in a manner to allow said fastener to clear said folded cable portion.

13. An assembly for making an electrical connection from at least one electrical device in a room or cabinet, said assembly comprising a cable connected to said device and comprising at least two electrical conductors and an insulative housing surrounding said conductors, the cross-sectional dimensions of said cable being such that said cable can be folded over itself to form a folded cable portion in a manner so that the two sections of the cable respectively extending from said folded cable portion are positioned at an angle to each other; and a mounting bracket extending over a portion of said cable to secure said cable sections in said angular relationship, said bracket comprising a first bracket portion for extending over said folded cable portion, a second bracket portion for extending over a portion of one of said cable sections, and a third bracket portion for extending over a portion of the other cable section, wherein said first, second, and third bracket portions have respective heights, and wherein the height of said first bracket portion is greater than the heights of said second and third bracket portions to accommodate said fold.

* * * * *